United States Patent

[11] 3,609,387

[72] Inventors Thomas O. Paine
Administrator of the National Aeronautics and Space Administration with respect to an invention of;
Edgar S. Davis, Pasadena, Calif.
[21] Appl. No. 21,906
[22] Filed Mar. 23, 1970
[45] Patented Sept. 28, 1971

[54] REFERENCE VOLTAGE-SWITCHING UNIT
9 Claims, 2 Drawing Figs.
[52] U.S. Cl. .................................................. 307/81, 307/223, 307/227, 328/186
[51] Int. Cl. .................................................. H03k 23/03
[50] Field of Search ..................................... 307/81, 223, 227; 328/104, 186

[56] References Cited
UNITED STATES PATENTS

| | | | |
|---|---|---|---|
| 2,899,567 | 8/1959 | Romano ........................ | 307/81 |
| 3,100,851 | 8/1963 | Ross et al. .................... | 328/186 X |
| 3,215,860 | 11/1965 | Neumann ..................... | 328/186 X |
| 3,235,840 | 2/1966 | Sturm ............................ | 307/223 X |
| 3,237,029 | 2/1966 | Cosby ........................... | 307/223 |
| 3,348,071 | 10/1967 | Chamberlin .................. | 307/223 B |
| 3,391,323 | 7/1968 | Ikeda ............................ | 307/223 X |
| 3,419,780 | 12/1968 | Vergez .......................... | 307/81 X |
| 3,430,073 | 2/1969 | Leonard ....................... | 307/223 X |

Primary Examiner—Robert K. Schaefer
Assistant Examiner—William J. Smith
Attorneys—J. H. Warden, Paul F. McCaul and G. T. McCoy ABSTRACT: A reference voltage-switching unit comprising a dual DC voltage power supply which provides +V DC and −V DC voltages across three of its output terminals, one of which is assumed to be at ground. The three terminals are connected to two unit output terminals through a switching unit which includes a voltage divider and three sets of SPDT contacts. The positions of the three sets of contacts are controlled as a function of the binary states of three stages of a three-stage ring counter. As the counter advanced through its eight-state cycle, the positions of the three sets of contacts vary so that the voltage across the unit output terminals follows a cyclically recirculating pattern including the values of +V, +V/2, O, −V/2, −V, −V/2 O and +V/2.

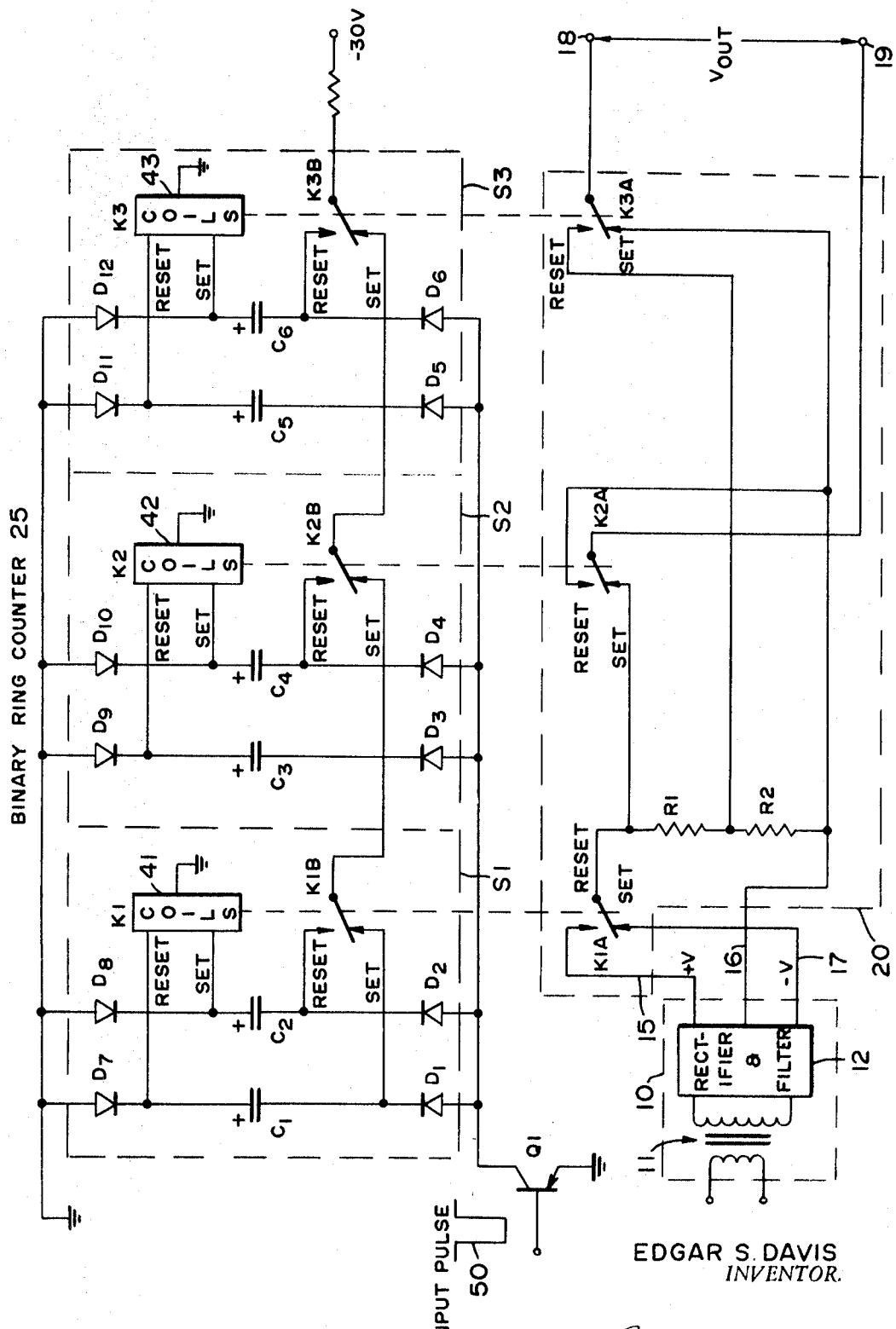

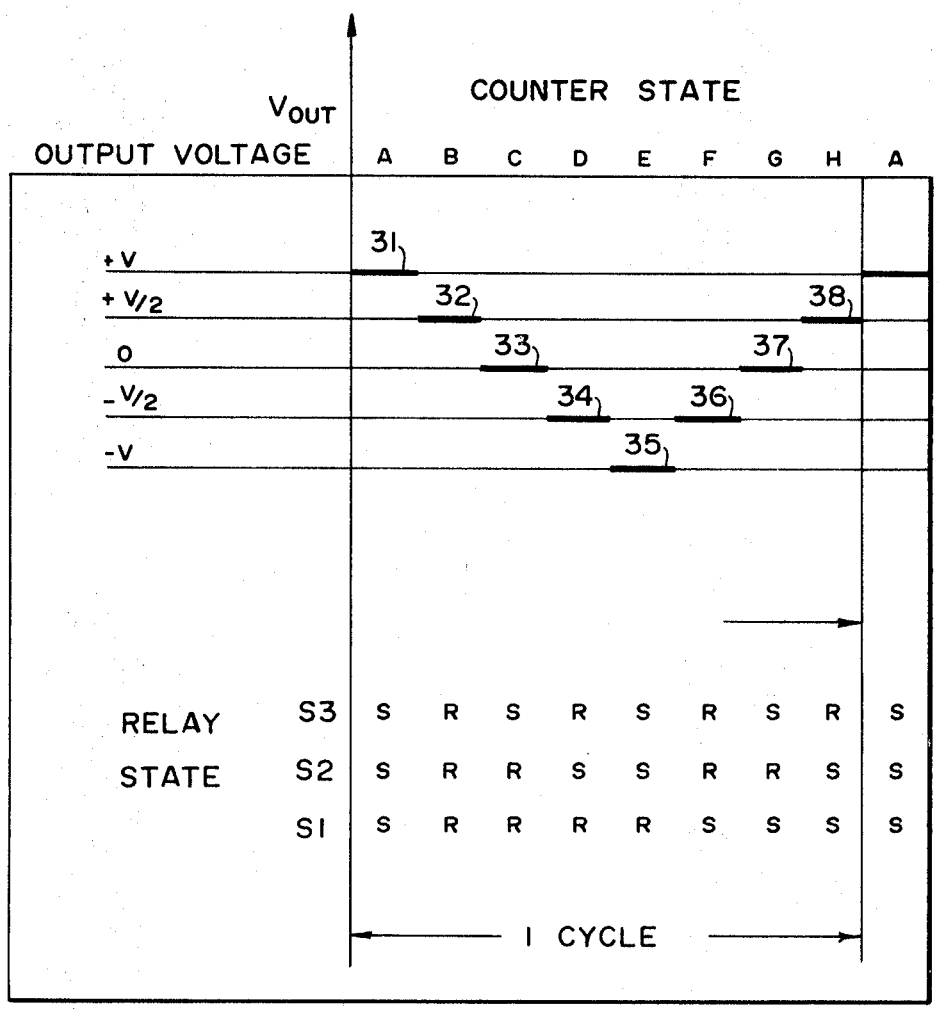

REFERENCE VOLTAGE-SWITCHING UNIT

ORIGIN OF INVENTION

The invention described herein was made in the performance of work under a NASA contract and is subject to the provisions of Section 305 of the National Aeronautics and Space Act of 1958, Public Law 85-568 (72 State. 435; 42 USC 2457).

BACKGROUND OF THE INVENTION

1. Field of the Invention

The present invention generally relates to voltage control circuitry and, more particularly, to a relay-controlled voltage switching unit whose output voltage follows a cyclically recurring pattern.

2. Description of the Prior Art

In some instrumentation applications a need exists for a reference voltage which follows a cyclically recurring pattern and which can be easily controlled by a simple single properly timed command. Such a need arose in the design of scanning circuitry for a tracker of the star Canopus which was selected to control the roll-angle of a spacecraft. During the course of a full sun orbit by the spacecraft, the star field, in which Canopus is one of many bright objects, appears to rotate once about the ecliptic pole, with the result that the sun-spacecraft-Canopus (cone) angle varies cyclically between ~ 75° and ~ 105°.

The Canopus star tracker provides spacecraft roll-error angle measurement by incorporating a scanning arrangement which repetitively scans a slit across a small region of the image field of view of the tracker. The tracker measures a phase angle which provides an error signal which is proportional to the subtended angle between the line of sight to the star and a reference axis in the mounting plane of the star tracker.

Due to the presence of background light and an excessive number of bright stars, near the same cone angle as Canopus, it is necessary that the tracker's field of view be restricted in cone angle to a fraction, such as 11°, of the total variation of the sun-spacecraft-Canopus (cone) angle which varies over a range of 30°. This requires that the narrow field of view be deflected in cone angle in five discretely stepped overlapping offsets to follow the variations in the Canopus cone angle. Since star trackers are likely to be used on most interplanetary space missions with each mission beginning and ending at a different point in the star cone angle cycle, it is important that the deflection voltage program be cyclical, and be startable at any point in the cycle. It is also important that the deflection voltage programmer have a nondestructive memory of its state since a star tracker may be turned off and then back on during a particular mission.

Since the tracker is to be used in a spacecraft, it is important that the circuitry which generates the reference voltage be highly reliable yet simple, so as to minimize malfunctioning and practically eliminate all maintenance requirements. Also, it is important that the circuitry be responsive to simple command signals either from a ground station or from onboard equipment.

OBJECTS AND SUMMARY OF THE INVENTION

It is a primary object of the present invention to provide a new voltage-switching unit, whose voltage output follows a cyclically recurring pattern.

Another object of the present invention is to provide a reliable yet simple voltage-switching unit which provides an output voltage which varies in magnitude and polarity in discrete steps in a cyclically recurring pattern.

A further object of the present invention is to provide a reliable, relatively simple voltage-switching unit which is controllable by a sequence of command signals in order to provide a cyclically recurring pattern of an output voltage with each step in the pattern being of a selected voltage and polarity.

These and other objects of the invention are achieved by providing a voltage-switching unit which includes a dual DC voltage power supply, connected to a pair of output terminals, through a voltage-switching section and a voltage divider. The voltage-switching section includes several single-pole double-throw (SPDT) contacts which are controlled as a function of the states of a multistage binary counter, such as a relay-type multistage ring counter. The connections between the output terminals and the power supply, which control the output voltage, depend on the positions of the SPDT contacts which are in turn controlled by the stages of the counter. As the counter advances through its binary states the SPDT contacts' positions vary so that the output voltage follows a cyclically recurring pattern.

The novel features of the invention are set forth with particularity in the appended claims. The invention will best be understood from the following description when read in conjunction with the accompanying drawings.

BRIEF DESCRIPTION OF THE DRAWINGS

FIG. 1 is a schematic and block diagram of the present invention; and

FIG. 2 is a chartlike diagram useful in explaining the operation of the circuitry, shown in FIG. 1.

DESCRIPTION OF THE PREFERRED EMBODIMENTS

Attention is now directed to FIG. 1 wherein the present invention is shown to include a dual DC voltage power supply 10, comprising a transformer 11, whose input terminals across the primary winding are assumed to be connected to an AC powerline. The transformer secondary winding is shown connected to a rectifier and filter 12 which has three output lines, designated 15, 16 and 17. Line 15 is assumed to be at +V DC volts above line 16 which may be assumed to be at ground, while line 17 is at −V volts with respect to ground.

The three output lines of the power supply 10 are connected to two output terminals 18 and 19 of the present invention, through a voltage-switching section 20. It is terminals 18 and 19 across which the output voltage $V_{oUT}$ of the present invention is applied as a cyclically recurring pattern.

The voltage-switching section 20 comprises a voltage divider which consists of two equal resistors R1 and R2 and three sets of single-pole double-throw (SPDT) contacts, designated K1A, K2A and K3A. The two positions of each set of contacts are designated as the SET and RESET positions. The three sets are diagrammed in their SET positions. The three sets of contacts are separately controlled by three stages S1, S2 and S3, which form a three-stage binary ring counter 25.

Each counter stage is either in a set S state or in a reset R state. In the present invention the positions of the three sets of contacts K1A, K2A and K3A correspond to the states of the three stages S1, S2 and S3. As diagrammed, the three stages are assumed to be in their S states, since the three sets of contacts are shown in their SET position.

As is appreciated by those familiar with the art, the combined states of the three stages of counter 25 define eight ($2^3$) possible counter states which represent one complete counter cycle. Thus during a complete counter cycle, the three sets of contacts assume eight different combinations of positions as diagrammed in the bottom half of FIG. 2.

For example, when the counter is in state A, the three stages S1, S2 and S3 are in their S states and consequently the sets of contacts are in their SET positions (as shown). As a result, line 16 of the power supply 10 which is at 0 volts is connected to output terminal 18 through the SET position of contact C3, while line 17 at −V volts is connected to terminal 19 through the SET positions of contacts K1A and K2A. Thus, the potential difference between terminals 18 and 19 is +V as indicated by bar 31 in FIG. 2.

During the next stage B of the counter, the three stages are in their R states. As a result, all the three sets of contacts K1A, K2A and K3A are in their RESET positions. Consequently, line 16 which is at ground is connected to terminal 19 through the RESET position of K2A. +V volts is applied across the two resistors R1 and R2 since line 15 is connected to R1 through the RESET position of K1A. Since the junction point of the two equal resistors is connected to terminal 18 through the RESET position of K3A, +V/2 is applied across terminals 18 and 19. The +V/2 potential difference is designated in FIG. 2 by bar 32.

During the next state C of the counter 25, when stages S1 and S2 remain in the R state and only the least significant stage in the binary order, i.e., S3 is switched to the S state, contact sets K1A and K2A are in their RESET positions and only K3A is in the SET position. Consequently, 0 volts is applied across terminals 18 and 19. This is the case since in this counter state, line 16 is connected to terminal 18 through the SET positions of contacts K3A while at the same time it, line 16, is connected to terminal 19 through the RESET position of K2A. This 0 output voltage is represented in FIG. 2 by bar 33.

The other discrete steps of the output voltage of −V/2, −V, −V/2, 0 and +V/2, which are designated by bars 34–38, respectively, are produced during the succeeding counter states, designated D through H. Thus, for the counter's eight states in each cycle, eight discrete output voltage steps are produced. These steps follow this cyclically recurring pattern as the counter recycles during a subsequent cycle.

From the foregoing it is thus seen that the cyclically recurring state pattern of a multistage binary counter are used to control the formation of discrete steps of an output voltage which also follows a cyclically recurring pattern. In the particular embodiment, a three-stage counter, having an eight-state cycle, is used to control the formation of eight discrete steps of the output voltage $V_{ouT}$. These steps are formed by using the three counter stages to control these SPDT sets of contacts of unit 20 and thereby control the connections between a dual DC voltage power supply and a pair of output terminals.

In the particular embodiment, which is diagrammed in FIG. 1, each stage of the counter is shown comprising, in addition to a pair of capacitors and four diodes, a double-coil, latching relay and a SPDT set of contacts. The switching section 20 and the counter 25 can be easily and conveniently implemented as one unit by employing three double-coil latching relays of the double-pole double-throw (DPDT) configuration. In such an arrangement one set of contacts of each relay is used as part of a counter stage and the other set is used as part of the switching section 20 which the relay has to control.

Such an arrangement is assumed in FIG. 1, in which the three relays are designated K1, K2 and K3. Relay K1 has double coils, designated by numeral 41, which control the positions of contacts K1B which form part of stage S1 and contacts K1A. Similarly, K2 comprises coils 42 with contact sets K2B and K2A, while K3 comprises coils 43 with contact sets K3B and K3A. Such an implementation minimizes the number of elements needed to form the switching section 20, as well as the problems of controlling contact sets K1A, K2A and K3A in order to produce the discrete steps of the output voltage. Such double-coil latching relays with a DPDT configuration are available commercially, such as for example a Teledyne relay type 0420–12.

The operation of the ring counter 25 may be described as follows. The state of the binary ring counter is changed by a momentary closure of a transistor switch Q1. The transistor may be driven by an input pulse 50, which may be furnished either by a telemetered command or from an onboard source. FIG. 1 shows the three relays with both sets of contacts of each relay in the SET positions. Each of the two relay coils operates on a capacitor discharge, and the necessary capacitor charge is provided by a source of negative voltage, such as −30v., connected to the moving contact of C3a through a resistor R3.

Initially, capacitors C1, C3 and C5 are charged to 30 volts through diodes D7, D9 and D11 and the counter SET contacts of the three relays. Diodes D2, D4 and D6 prevent charging of capacitors C2, C4 and C6. A momentary closure of transistor Q1 is effected by the input pulse. This provides a low resistance path which discharges capacitor C1 through the reset coil of relay K1 to ground, capacitor C3 through the reset coil of relay K2 to ground, and capacitor C5 through the reset coil of relay K3, transferring both sets of contacts of each relay from the SET to the RESET position and shifting the scan reference one step from state A to state B as shown in FIG. 2. Only capacitor C6 can now charge to 30 volts through diode D12 since, diodes D1, D2, D3, D4 and D5 prevent charging of the other capacitors.

On the next impulse to switch Q1, capacitor C6 discharges through the SET coil of relay K3, changing both sets of its contacts from the RESET to the SET position, shifting the scan reference one step from state B to state C as shown in FIG. 2. Since the coils of relays K1 and K2 were not impulsed, their contacts remain in RESET position. Subsequent impulse operation of switch Q1, produces the series of relay contact states shown in the table in FIG. 2, and this sequences the output voltage from state C to states D, E, F, G and H, and eventually to state A, at which the sequence repeats.

It is apparent that by such a switching sequence, it is possible to place the output voltage at any step, as for example at state D, of the counter when the voltage is −V/2 and then proceed by sequential impulsing the counter to pass through a series of steps represented by states E, F, G, H, A, B, C, etc.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A voltage switching unit, comprising:
a dual direct-current voltage power supply;
first and second output terminals;
interconnecting means including $n$ switchable means for connecting the output of said power supply to said output terminals each switchable means being switchable between an active state and an inactive state; and
binary counting means of $n$ stages for controlling the states of said $n$ switchable means to control the voltage across said output terminals to follow a cyclically recurring pattern of $2^n$ levels as a function of the changes of the binary states of the $h$ stages of said binary counting means, each of said $n$ stages controlling the state of a different switchable means, with at least two of said stages being in a binary state, whereby at least two of said $n$ switchable means are in their active state, to provide selected ones of said $2^n$ levels.

2. The arrangement as recited in claim 1 wherein said power supply has first, second and third output lines, said first line being at +V volts above said second line and said third line being at −V volts below said second line and said cyclically recurring pattern of said output voltage includes three levels at which the voltage difference between said first and second output terminals is +V volts, 0 volt and −V volts and each switchable means is a single-pole double-throw switch which is either in its active state or inactive state when the stage of the binary counting means with which it is associated, is in either a first binary state or a second binary state respectively, each switch providing a first signal path therethrough when being in said active state and a second signal path when being in said inactive state.

3. The arrangement as recited in claim 2 wherein said voltage levels include the levels of +V volts, 0 volt and −V volts.

4. The arrangement as recited in claim 3 wherein $n$ is sufficiently large and said voltage levels includes levels of $+1/xV$ and $-1/xV$ where $x$ is an integer greater than 1.

5. The arrangement as recited in claim 4 wherein $n=3$.

6. The arrangement as recited in claim 5 wherein each set of contacts is a first set of contacts of a dual-coil relay with two sets of single-pole double-throw contacts, with the second set of said contacts and said dual coil forming part of the binary stage which is associated with said first set of contacts.

7. The arrangement as recited in claim 1 wherein said interconnecting means include voltage dividing means whereby said cyclically recurring pattern of said output voltage includes two levels at which the voltage difference between said first and second output terminals is between 0 and +V volts and between 0 and −V volts.

8. The arrangement as recited in claim 1 wherein said switchable means comprises $n$ sets of single-pole double-throw contacts, said power supply has first, second and third output lines which are at +V volts, 0 volt and −V volts respectively, said interconnecting means comprises interconnecting lines which interconnect said power supply output lines with said output terminals through said $n$ sets of contacts, and wherein said binary-counting means comprises an $n$ stage binary counter, each counter stage being associated with a different one of said $n$ sets of contacts, for controlling the position of the associated set of contacts as a function of the stage's binary state, whereby the output voltage across said output terminals follows a cyclically recurring pattern as a function of the positions of said $n$ sets of contacts.

9. The arrangement as recited in claim 8 wherein each set of contacts is a first set of contacts of a dual-coil relay with two sets of single-pole double-throw contacts, with the second set of said contacts and said dual-coil forming part of the binary stage which is associated with said first set of contacts.